(12) United States Patent
Hou (10) Patent No.: US 12,504,953 B2
(45) Date of Patent: Dec. 23, 2025

(54) DATA INTERACTION METHOD AND APPARATUS, AND COMPUTER DEVICE AND STORAGE MEDIUM

(71) Applicant: Suzhou MetaBrain Intelligent Technology Co., Ltd., Jiangsu (CN)

(72) Inventor: Zhili Hou, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/876,725

(22) PCT Filed: Jun. 19, 2023

(86) PCT No.: PCT/CN2023/100977
§ 371 (c)(1),
(2) Date: Dec. 19, 2024

(87) PCT Pub. No.: WO2024/108995
PCT Pub. Date: May 30, 2024

(65) Prior Publication Data
US 2025/0173125 A1   May 29, 2025

(30) Foreign Application Priority Data
Nov. 21, 2022 (CN) .......................... 202211457886.3

(51) Int. Cl.
*G06F 9/44* (2018.01)
*G06F 8/30* (2018.01)
(Continued)

(52) U.S. Cl.
CPC ................ *G06F 8/30* (2013.01); *G06F 16/21* (2019.01); *G06F 16/2282* (2019.01)

(58) Field of Classification Search
CPC ........ G06F 8/30; G06F 16/21; G06F 16/2282; G06F 9/5016
See application file for complete search history.

(56) References Cited

U.S. PATENT DOCUMENTS 11,245,744 B1 *  2/2022  Brevoort ................. H04L 67/02
11,347,622 B1    5/2022  Agarwal et al.
(Continued)

FOREIGN PATENT DOCUMENTS

CN       105630913 A       6/2016
CN       110325929 A  *   10/2019  ........... G05B 19/042
(Continued)

OTHER PUBLICATIONS

Ovidiu Serban, AgentSlang: A Fast and Reliable Platform for Distributed Interactive Systems, 2013, pp. 1-8. https://ieeexplore.ieee.org/stamp/stamp.jsp?tp=&arnumber=6646077 (Year: 2013).*
(Continued)

*Primary Examiner* — Mongbao Nguyen
(74) *Attorney, Agent, or Firm* — Cooper Legal Group, LLC (57) ABSTRACT

The present application relates to a data interaction method and apparatus, and a computer device and a storage medium. The method includes: constructing function words and command words, which are related to communication information configured for performing interaction with a software system; setting a channel for publishing and subscribing to a remote dictionary server database monitoring the function words and the command words on the channel in real time to identify a changed function word and/or command word; determining whether the changed function word and/or command word is data information required or maintained by a target process; if yes, maintaining corresponding communication information to a storage space of the target process; writing the obtained communication information
(Continued)

into the remote dictionary server database; and publishing the function words and the command words onto the channel for use by other processes.

19 Claims, 6 Drawing Sheets

(51) Int. Cl.
  *G06F 9/45* (2006.01)
  *G06F 9/455* (2018.01)
  *G06F 16/21* (2019.01)
  *G06F 16/22* (2019.01)

(56) References Cited

U.S. PATENT DOCUMENTS

| | | | | |
|---|---|---|---|---|
| 2014/0337496 | A1* | 11/2014 | Ramachandran | ... H04L 67/1023 709/223 |
| 2015/0237157 | A1 | 8/2015 | Wang | |
| 2018/0329940 | A1 | 11/2018 | Tiku et al. | |
| 2021/0271660 | A1* | 9/2021 | Jo | ............ G06F 16/245 |
| 2022/0075825 | A1* | 3/2022 | Helms | ............ H04L 9/3234 |
| 2022/0103525 | A1* | 3/2022 | Shribman | ............ H04L 67/02 |
| 2022/0327101 | A1* | 10/2022 | Pool | ............ G06N 3/082 |
| 2023/0205782 | A1* | 6/2023 | Park | ............ G06F 16/21 707/770 |

FOREIGN PATENT DOCUMENTS

| | | | | |
|---|---|---|---|---|
| CN | 111309405 | A | | 6/2020 |
| CN | 112035572 | A * | 12/2020 | ............ G06F 16/22 |
| CN | 113573171 | A * | 10/2021 | ............ H04L 67/141 |
| CN | 113590253 | A * | 11/2021 | ............ G06F 9/544 |
| CN | 114817317 | A | | 7/2022 |
| CN | 114968264 | A * | 8/2022 | ....... G06F 15/17306 |
| CN | 115587086 | A | | 1/2023 |

OTHER PUBLICATIONS

English translation, Litichver et al. (CN 110325929 A), 2019, pp. 1-56. (Year: 2019).*
English translation, Xu et al. (CN 112035572 A), 2020, pp. 1-19. (Year: 2020).*
English translation, Yong et al. (CN 113573171 A), 2021, pp. 1-20. (Year: 2021).*
Chen Hongsong, Design and implemention of Cloud server remote management system based on IMPI protocol, 2015, pp. 1-4. https://ieeexplore.ieee.org/stamp/stamp.jsp?tp=&arnumber=7518445 (Year: 2015).*
English translation, Yang et al. (CN 113590253 A), 2021, pp. 1-17. (Year: 2021).*
English translation, Dai et al. (CN 114968264 A), 2022, pp. 1-13. (Year: 2022).*
International Search Report cited in PCT/CN2023/100977, mailed Sep. 19, 2023, 5 pages.
Written Opinion cited in PCT/CN2023/100977, mailed Sep. 19, 2023, 6 pages.
First Office Action cited in CN202211457886.3, mailed 203-01-19, 6 pages.
Notification to Grant Patent Right for Invention cited in CN202211457886.3, mailed Feb. 25, 2023, 2 pages.

* cited by examiner

DATA INTERACTION METHOD AND APPARATUS, AND COMPUTER DEVICE AND STORAGE MEDIUM

This application claims priority to Chinese Patent Application No. 202211457886.3, entitled "DATA INTERACTION METHOD AND APPARATUS, AND COMPUTER DEVICE AND STORAGE MEDIUM", filed with the China National Intellectual Property Administration on Monday, Nov. 21, 2022, which is incorporated herein by reference in its entirety.

FIELD

The present application relates to the technical field of data interaction, and in particular, to a data interaction method and apparatus, and a computer device and a storage medium.

BACKGROUND

With continuous and rapid growth of a software industry, scale of software is also increasing rapidly, and functionalities that a software product supports are expanding rapidly. This requires architects or program developers to conduct modular and decoupled design during designing architectures of software products so as to reduce inter-module coupling and improve maintainability and the code stability. At present, code modularization design includes code management modularization and code logic modularization. The code management modularization mainly involves managing functional modules in a form of code packages, where each code package implements functions of modules and complies the functions into static libraries or dynamic link libraries. This scheme offers the modularization design from a perspective of code management, but during compilation of the code packages into a static library, there are complex dependencies between the code packages. The code logic modularization focuses on logic modularization between functional modules, involving data interaction between modules. A well-designed data interaction mode may effectively decouple code modules, and may achieve greater effects with less efforts.

However, among commonly used data interaction schemes for modules, different modules perform data interaction according to a traditional inter-process communication method, such as socket communication, pipeline communication, and internal memory sharing communication. Such a method belongs to a mechanism provided by a Linux system and has a stability to an extent. It is also the most widely used data interaction method, but this method still relies too much on implementation states and stability states of other functional modules. Functions of a Baseboard Management Controller (BMC) in a server are taken as an example. A restful interface relies on implementation and stability of a function of an Intelligent Platform Management Interface (IPMI). When corresponding data needs to be obtained from a web interface, the restful interface needs to be used to create a socket to communicate with an IPMI module to obtain data. Once the function of the IPMI module is abnormal or an IPMI process exits abnormally, it will cause the restful interface to be unable to provide web services normally. In addition, socket communication, pipeline communication, and other communication methods may achieve mutual communication between two functional modules, and may not achieve data interaction between multiple modules. When the internal memory sharing communication is configured for interaction, multiple processes and multiple threads simultaneously manage and process the same internal memory, which may easily cause a problem that if one functional module fails, it may contaminate data in the shared internal memory, and other modules may fail to function. This affects the stability and the code robustness. In addition, changes of the data in the shared internal memory may not be detected because there are many useless polling code logics, which affects the performance and operation efficiency of a system.

SUMMARY

Based on this, it is necessary to provide a data interaction method and apparatus, and a computer device and a storage medium for the technical problems in the above currently used data interaction method for modules.

In an aspect, a data interaction method is provided, including:

constructing function words and command words, which are related to communication information, where the communication information is configured for performing interaction with a software system, and the communication information includes parameters and/or data; setting a channel for publishing and subscribing to a redis database, where the channel is configured for transmitting the function words and the command words; performing process definition and division according to functions of the software system; monitoring the function words and the command words on the channel in real time to identify a changed function word and/or a changed command word; determining whether the changed function word and/or the changed command word is data information required or maintained by a target process; in response to a determining result being that the changed function word and/or the changed command word is the data information required or maintained by the target process, obtaining corresponding communication information according to the changed function word and/or the changed command word on the channel, and maintaining the corresponding communication information to a storage space of the target process; determining whether the communication information obtained by the target process needs to be written into the remote dictionary server database; if the communication information obtained by the target process needs to be written into the remote dictionary server database, writing the communication information obtained into the remote dictionary server database; and publishing the function words and the command words, which are related to the communication information obtained, onto the channel for use by other processes.

In some embodiments, in the step of constructing function words and command words, which are related to communication information for performing interaction with a software system, the function words are identifiers for identifying a target function after classification according to functions, and the command words are configured for classifying different interaction information categories under the target function.

In some embodiments, a value range of the function words is 0 to 255, and each function word is configured for identifying data or a parameter related to the target function in the software system.

In some embodiments, the software system includes a baseboard management controller (BMC) in a server, and power supply unit (PSU) information, sensor information, graphics processing unit (GPU) data, and assets information are classified according to functions in the baseboard management controller.

In some embodiments, a value range of the command words is 0 to 255, and the command words include data information, attribute information, and state information.

In some embodiments, in the step of performing process definition and division according to functions of the software system, each target process creates a target thread started up for processing the communication information, and the target thread is configured for maintaining the communication information related to the target process.

In some embodiments, in the step of setting a channel for publishing and subscribing to a redis database, the channel being configured for transmitting the function words and the command words, a channel name for publishing and subscribing to the redis database is set; and the redis database is an internal memory type database defined through a key-value pair.

In some embodiments, the step of monitoring function words and command words on the channel in real time to identify a changed function word and/or a changed command word includes: monitoring, through a subscribe command of the redis database, communication information transmitted from the channel corresponding to the channel name; and when it is monitored that the communication information changes, determining, through the function words and the command words which are transmitted from the channel, which information point in which type of parameters and/or data has a data change.

In some embodiments, during determining whether the changed communication information is data information required or maintained by a corresponding process, if the changed communication information is not the data information required or maintained by the corresponding process, the channel is continued to be monitored.

In some embodiments, the step of obtaining the corresponding communication information according to the function word and the command word of the changed communication information on the channel, and determining whether the obtained communication information is valid includes: obtaining the function word and the command word of the changed communication information on the channel; determining whether the function word and the command word of the changed communication information are in a local maintenance list; if the function word and the command word of the changed communication information is in the local maintenance list, obtaining the corresponding communication information from the redis database according to the function word and the command word of the changed communication information on the channel; and determining whether the obtained information is valid.

In some embodiments, if the function word and the command word of the changed communication information is not in the local maintenance list, continuing to monitor the channel.

In some embodiments, if the obtained communication information is invalid, continuing to monitor the channel.

In some embodiments, after a step of maintaining the communication information to a storage space of a corresponding process, the method further includes: determining whether the corresponding communication information received by the corresponding process needs to be written into the redis database; if the corresponding communication information received by the corresponding process needs to be written into the redis database, writing the corresponding communication information into the redis database; and publishing the function word and the command word, which are related to the communication information, onto the channel for use by other processes.

In some embodiments, the publishing the function word and the command word, which are related to the communication information, onto the channel includes: through a publish command of the redis database, publishing the function word and the command word, which are related to the parameter, onto the channel corresponding to the channel name.

In some embodiments, the corresponding parameters and/or data received by the corresponding process includes a parameter configured through a web interface or data monitored from a component such as a GPU. When the corresponding parameters and/or data received by the corresponding process is the parameter configured through the web interface or the data monitored from the component such as the GPU, it is determined that the corresponding communication information received by the corresponding process needs to be written into the redis database.

In another aspect, a data interaction apparatus is provided. The apparatus includes: a function word and command word setting module, configured for constructing function words and command words, which are related to communication information, where the communication information is configured for performing interaction with a software system, and the communication information includes parameters and/or data; a channel setting module, configured for setting a channel for publishing and subscribing to a redis database, where the channel is configured for transmitting the function words and the command words; a process management module, configured for performing process definition and division according to functions of the software system; a monitoring module, configured for monitoring the function words and the command words on the channel in real time to identify a changed function word and/or a changed command word; a data maintenance determining module, configured for determining whether the changed function word and/or the changed command word is data information required or maintained by a target process; and a valid data management module, configured for: in response to a determining result being that the changed function word and/or command word is the data information required or maintained by the target process, obtaining corresponding communication information according to the changed function word and/or the changed command word on the channel, and maintaining the corresponding communication information to a storage space of the target process; determining whether the communication information obtained by the target process needs to be written into the remote dictionary server database; if the communication information obtained by the target process needs to be written into the remote dictionary server database, writing the obtained communication information into the remote dictionary server database; and publishing the function words and the command words, which are related to the communication information obtained, onto the channel for use by other processes.

In some embodiments, the function word and command word setting module includes:
 a function word setting module, configured for setting identifiers to be the function words, the identifiers being configured for identifying a target function after classification according to functions, where a value range of the function words is 0 to 255; each function word is configured for identifying data or a parameter related to the target function in the software system; and a command word setting module, configured for setting identifiers to be the command words, the identifiers being configured for classifying different interaction information categories under the target function, where a value range of the command words is 0 to 255; and the command words include data information, attribute information, and state information.

In some embodiments, the channel setting module is configured for setting a channel name for publishing and subscribing to the redis database; and the redis database is an internal memory type database defined through a key-value pair;

the monitoring module is configured for monitoring, through a subscribe command of the redis database, communication information transmitted from the channel corresponding to the channel name; and when it is monitored that the communication information changes, determining, through the function words and the command words which are transmitted from the channel, which information point in which type of parameters and/or data has a data change;

the data maintenance determining module is configured for: during determining whether the changed communication information is data information required or maintained by a corresponding process, if the changed communication information is not the data information required or maintained by the corresponding process, continuing to monitor the channel;

In some embodiments, the valid data management module is configured for: obtaining the function word and the command word of the changed communication information on the channel; determining whether the function word and the command word of the changed communication information are in a local maintenance list; if the function word and the command word of the changed communication information is not in the local maintenance list, continuing to monitor the channel; if the function word and the command word of the changed communication information is in the local maintenance list, obtaining the corresponding communication information from the redis database according to the function word and the command word of the changed communication information on the channel; determining whether the obtained information is valid; and if the obtained communication information is invalid, continuing to monitor the channel.

In some embodiments, the data interaction apparatus further includes a data writing management module. The data writing management module is configured for: determining whether the corresponding communication information received by the corresponding process needs to be written into the redis database; if the corresponding communication information received by the corresponding process needs to be written into the redis database, writing the corresponding communication information into the redis database; and through a publish command of the redis database, publishing the function word and the command word, which are related to the parameter, onto the channel corresponding to the channel name for use by other processes.

In still another aspect, a computer device is provided, including a memory, a processor, and a computer program stored on the memory and runnable on the processor. The processor, when running the computer program, implements the following steps:

constructing function words and command words, which are related to communication information, where the communication information is configured for performing interaction with a software system, and the communication information includes parameters and/or data;

setting a channel for publishing and subscribing to a redis database, the channel being configured for transmitting the function words and the command words;

performing process definition and division according to functions of the software system;

monitoring function words and command words on the channel in real time to identify a changed function word and/or a changed command word;

determining whether the changed function word and/or the changed command word is data information required or maintained by a target process;

in response to a determining result being that the changed function word and/or the changed command word is the data information required or maintained by the target process, obtaining corresponding communication information according to the changed function word and/or the changed command word on the channel, and maintaining the communication information to a storage space of the target process;

determining whether the communication information obtained by the target process needs to be written into the redis database;

if the communication information obtained by the target process needs to be written into the redis database, writing the obtained communication information into the redis database; and publishing the function word and the command word, which are related to the obtained communication information, onto the channel for use by other processes.

In yet another aspect, a non-volatile computer-readable storage medium is provided, having a computer program stored thereon. The computer program, when run by a processor, implements the following steps:

constructing function words and command words, which are related to communication information, where the communication information is configured for performing interaction with a software system, and the communication information includes parameters and/or data;

setting a channel for publishing and subscribing to a redis database, the channel being configured for transmitting the function words and the command words;

performing process definition and division according to functions of the software system;

monitoring function words and command words on the channel in real time to identify a changed function word and/or a changed command word;

determining whether the changed function word and/or the changed command word is data information required or maintained by a target process;

in response to a determining result being that the changed function word and/or the changed command word is the data information required or maintained by the target process, obtaining corresponding communication information according to the changed function word and/or the changed command word on the channel, and maintaining the communication information to a storage space of the target process;

determining whether the communication information obtained by the target process needs to be written into the redis database;

if the communication information obtained by the target process needs to be written into the redis database, writing the obtained communication information into the redis database; and publishing the function word and the command word, which are related to the obtained communication information, onto the channel for use by other processes.

According to the above data interaction method and apparatus, the computer device, and the storage medium, mainly by designing each process as a producer and a consumer of communication information, monitoring changes in data and parameters in an entire software system through a subscribe mechanism of a redis database, and then integrating, according to a requirement of a current process, the communication information stored in the redis database into a storage space of a local process for application, the stability and robustness of the software system are improved. The method and apparatus may be applied to software systems that use the redis database, and the competitiveness of a software product is improved.

The above data interaction method in the present application achieves decoupling of the modules of the BMC based on the publish and subscribe mechanisms of the redis database, and has the following advantages:

1. Through the publish and subscribe mechanisms of the redis database, different modules in the software system are completely decoupled. Each process needs to focus on data related to this process. Even if other processes hang up, this process may maintain normal operations of a local process according to the communication information obtained by this process.
2. The method for integrating the parameters and/or data in the redis database into a local internal memory space ensures that even if a breakdown or crash occurs in the redis database, the normal operations of the local process may not be affected. Furthermore, before the integration, the validity of the parameters and/or data is effectively verified to ensure the validity of the data in the local storage space.
3. Each message in a redis message channel includes a function word and a command word, occupying two bytes of an internal memory space. In this way, when a speed of the consumer is lower than a speed of the producer at a moment, as long as the customer is not always slower than the producer, normal operations of the software system may be ensured, and a common problem that the internal memory is excessively full may be avoided.
4. It is in a blocked state during event subscription, without occupying system resources of a central processing unit (CPU). Compared with a polling method, this method has higher efficiency and occupies a fewer of system resources.
5. For naming of subscribe and publish channels, classification and multiple naming may be performed according to requirements of own software systems, and more flexible application is achieved.

BRIEF DESCRIPTION OF THE DRAWINGS

For clearer descriptions of the technical solutions according to the embodiments of the present application, the drawings required to be used in the description of the embodiments are briefly introduced below. It is obvious that the drawings in the description below are some embodiments of the present application, and it is obvious for those skilled in the art that other drawings may be acquired according to the drawings without creative efforts.

DETAILED DESCRIPTION

In order to make the objectives, technical solutions, and advantages of the present application clearer, the following is a further detailed explanation of the present application in conjunction with the accompanying drawings and embodiments. It should be understood that the embodiments described here are intended to explain the present application and are not intended to limit the present application.

The present application provides a data interaction method, which is a method for achieving decoupling of and data interaction between modules of a baseboard management controller (BMC) based on publish and subscribe mechanisms of a redis database.

Figure 1:
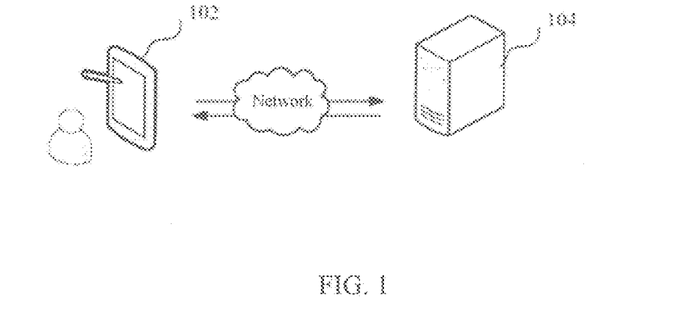
FIG. 1 is a diagram of an application environment of a data interaction method in some embodiments.

The data interaction method provided by the present application may be applied to an application environment as shown in FIG. 1. A terminal 102 communicates with a server 104 through a network. The terminal 102 may be, but is not limited to, various personal computers, laptops, smartphones, tablets, and portable wearable devices. The server 104 may be implemented using an independent server or a server cluster composed of a plurality of servers. A BMC is configured in the server 104.

Figure 2:
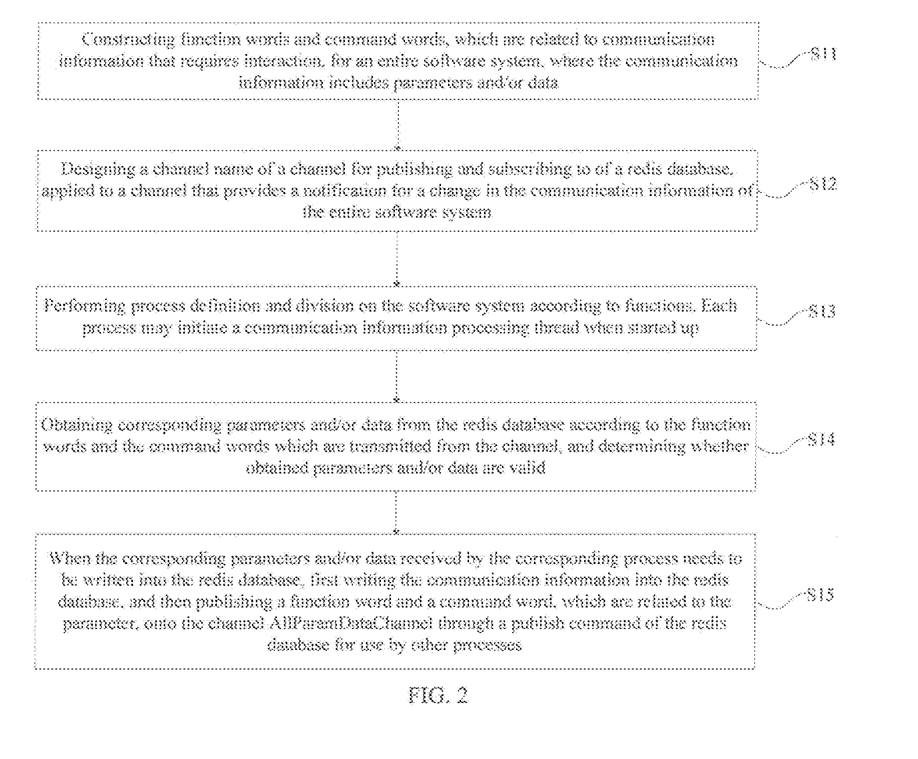
FIG. 2 is a flowchart of the data interaction method in some embodiments.

In some embodiments, as shown in FIG. 2, a data interaction method is provided. Application of the method to the server 104 in FIG. 1 is taken as an example for explanation. Main implementation steps are as follows:

Step S11: Constructing function words and command words, which are related to communication information that requires interaction, for an entire software system. The communication information includes parameters and/or data. The function words are identifiers configured for identifying a target function after classification according to functions. For division of functions in the BMC of the server, if power supply unit (PSU) information belongs to a category, sensor information belongs to a category, graphics processing unit (GPU) data belongs to a category, and assets information belongs to a category, a function word of the PSU information may be defined as 0x00, a function word of the sensor information may be defined as 0x01, a function word of the GPU data may be defined as 0x02, and a function word of the assets information may be defined as 0x03. The command words are a subdivision of the function words. For example, the sensor information may include sensor data information, sensor attribute information, sensor state information, and the like, which may be distinguished by the command words. Based on the above explanation, the definitions of the function words and the definitions of the command words are shown in the table below.

| Serial number | Field name | Value range | Description |
|---|---|---|---|
| 1 | Function word (NetFn) | 0-255 | To identify data or a parameter related to a target function in a software system |
| 2 | Command word (Cmd) | 0-255 | To identify classification of different information categories under a function |

Step S12: Designing a channel name of a channel for publishing and subscribing to a redis database. The channel name is applied to a channel that provides a notification for a change in the communication information of the entire software system. At present, the channel is named as AllParamDataChannel.

Step S13: Performing process definition and division on the software system according to functions. Each process may initiate a communication information processing thread when started up. The thread is mainly configured for maintaining communication information related to the corresponding process.

The communication information transmitted from the channel AllParamDataChannel is monitored through a subscribe command of the redis database. When it is monitored that the communication information changes, according to the function words and the command words which are transmitted from the channel, it may determine which information point in which type of parameters and/or data has a data change. Whether the data is data information required or maintained by a corresponding process is determined. If yes, step S14 is executed. If no, information changes on the channel AllParamDataChannel are continued to be monitored.

Figure 3:
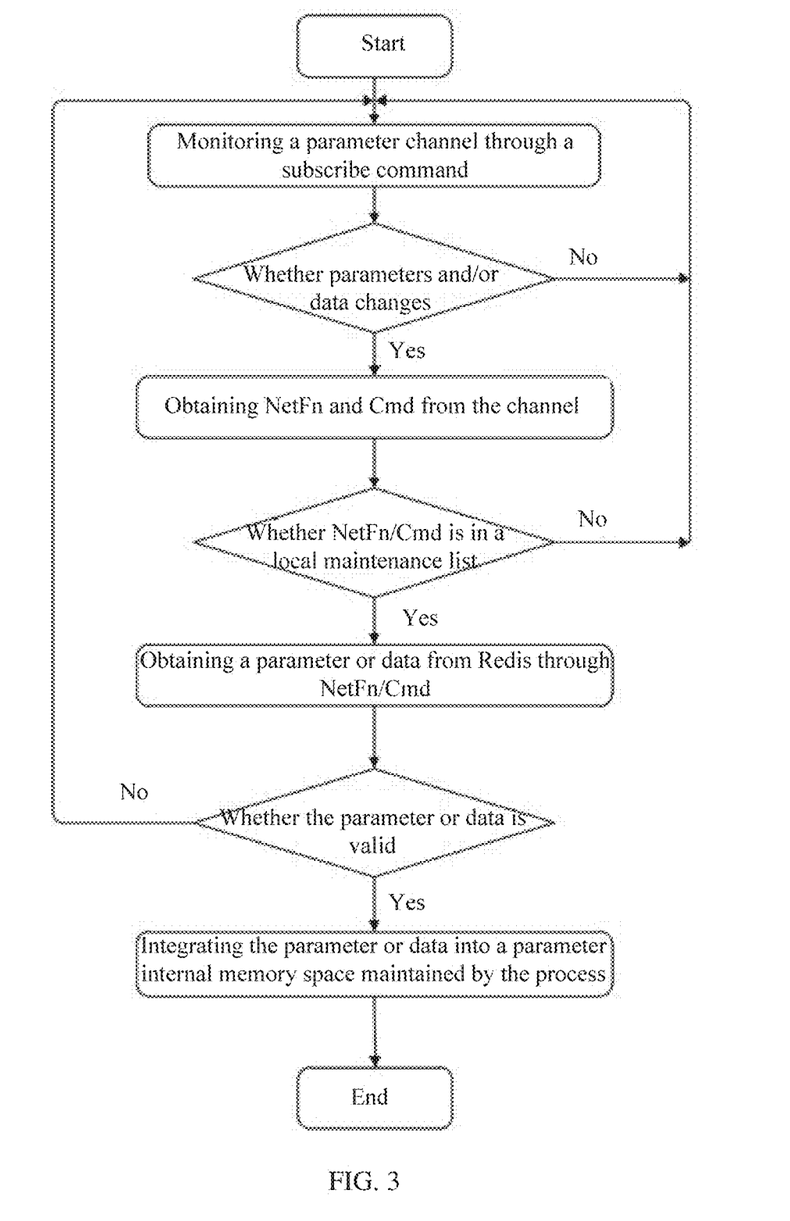
FIG. 3 is a flowchart of a step of obtaining corresponding parameters and/or data from a redis database according to function words and command words which are transmitted from a channel, and determining whether obtained parameters and/or data is valid in some embodiments.

Step S14: Obtaining corresponding parameters and/or data from the redis database according to the function words and the command words which are transmitted from the channel; determining whether obtained parameters and/or data are valid; continuing to monitor the channel AllParamDataChannel if the parameters and/or data are invalid; and maintaining the parameters and/or data to a storage space of the corresponding process if the parameters and/or data are valid. An execution flowchart is as shown in FIG. 3.

Step S15: When the corresponding parameters and/or data received by the corresponding process, such as a parameter configured through a web interface or data monitored by a component such as a GPU, needs to be written into the redis database, first writing the communication information into the redis database, and then publishing a function word and a command word, which are related to the parameters and/or data, onto the channel AllParamDataChannel through a publish command of the redis database for use by other processes.

The redis database is an internal memory type database defined through a key-value pair, which has a high speed.

According to the above data interaction method, mainly by designing each process as a producer and a consumer of communication information, monitoring changes in data and parameters in an entire software system through a subscribe mechanism of a redis database, and then integrating, according to a requirement of a current process, the communication information stored in the redis database into a storage space of a local process for application, the stability and robustness of the software system are improved. The method may be applied to software systems that use the redis database, and the competitiveness of a software product is improved.

The above data interaction method in the present application achieves decoupling of the modules of the BMC based on the publish and subscribe mechanisms of the redis database, and has following advantages:

1. Through the publish and subscribe mechanisms of the redis database, different modules in the software system are completely decoupled. Each process needs to focus on data related to this process. Even if other processes hang up, this process may maintain normal operations of a local process according to the communication information obtained by this process.
2. The method for integrating the parameters and/or data in the redis database into a local internal memory space ensures that even if a breakdown or crash occurs in the redis database, the normal operations of the local process may not be affected. Furthermore, before the integration, the validity of the parameters and/or data is effectively verified to ensure the validity of the data in the local storage space.
3. Each message in a redis message channel includes a function word and a command word, occupying two bytes of the internal memory space. In this way, when a speed of the consumer is lower than a speed of the producer at a moment, as long as the customer is not always slower than the producer, normal operations of the software system may be ensured, and a common problem that the internal memory is excessively full may be avoided.
4. It is in a blocked state during event subscription, without occupying system resources of a central processing unit (CPU). Compared with a polling method, this method has higher efficiency and occupies a fewer of system resources.
5. For naming of subscribe and publish channels, classification may be performed according to requirements of own software systems, and more flexible application is achieved.

The data interaction method provided by some embodiments of the present application may be applied to an application environment as shown in FIG. 1. A terminal 102 communicates with a server 104 through a network. The terminal 102 may be, but is not limited to, various personal computers, laptops, smartphones, tablets, and portable wearable devices. The server 104 may be implemented using an independent server or a server cluster composed of a plurality of servers. A baseboard management controller (BMC) is configured in the server 104.

Figure 4:
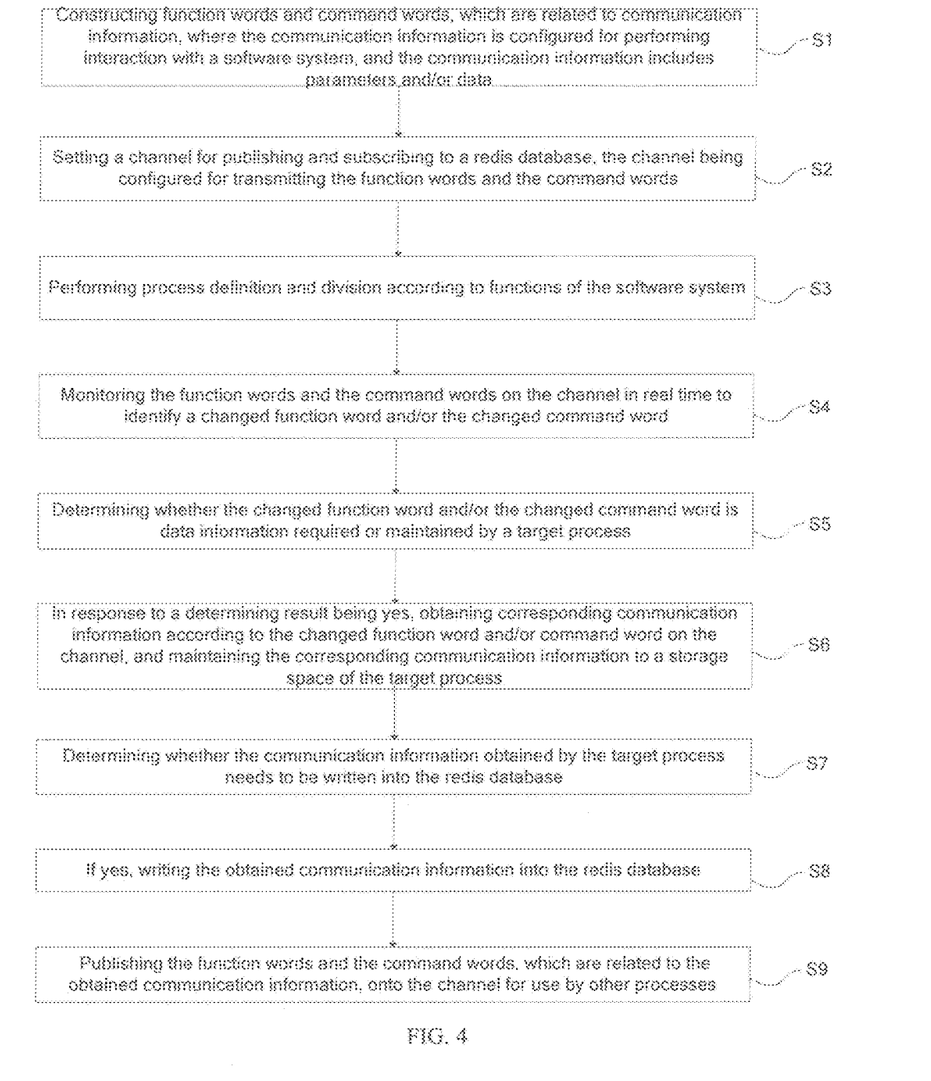
FIG. 4 is a flowchart of the data interaction method in another embodiment.

In some embodiments, as shown in FIG. 4, a data interaction method is provided. Application of the method to the server 104 in FIG. 1 is taken as an example for explanation. The method includes following steps:

Step S1, constructing function words and command words, which are related to communication information, where the communication information is configured for performing interaction with a software system, and the communication information includes parameters and/or data;

Step S2, setting a channel for publishing and subscribing to a redis database, the channel being configured for transmitting the function words and the command words;

Step S3, performing process definition and division according to functions of the software system, where when started up, each target process creates a target thread for processing the communication information, and the target thread is configured for maintaining the communication information related to the target process;

Step S4, monitoring function words and command words on the channel in real time to identify a changed function word and/or a changed command word;

Step S5, determining whether the changed function word and/or the changed command word is data information required or maintained by a target process;

Step S6, in response to a determining result being that the changed function word and/or the changed command word is the data information required or maintained by the target process, obtaining corresponding communication information according to the changed function word and/or the changed command word on the channel, and maintaining the corresponding communication information to a storage space of the target process;

Step S7, determining whether the communication information obtained by the target process needs to be written into the redis database;

Step S8, if the communication information obtained by the target process needs to be written into the redis database, writing obtained communication information into the redis database; and Step S9, publishing the function words and the command words, which are related to the obtained communication information, onto the channel for use by other processes.

In some embodiments, in a step of constructing the function words and the command words, which are related to the communication information for performing interaction with the software system, the function words are identifiers for identifying a target function after classification according to functions, and the command words are configured for classifying different interaction information categories under the target function.

In some embodiments, a value range of the function words is 0 to 255, and each function word is configured for identifying data or a parameter related to the target function in the software system.

In some embodiments, the software system includes the baseboard management controller (BMC) in the server, and power supply unit (PSU) information, sensor information, graphics processing unit (GPU) data, and assets information are classified according to functions in the baseboard management controller. A function word of the PSU information may be defined as 0x00, a function word of the sensor information may be defined as 0x01, a function word of the GPU data may be defined as 0x02, and a function word of the assets information may be defined as 0x03.

In some embodiments, a value range of the command words is 0 to 255, and the command words include data information, attribute information, and state information.

Based on the above explanation, definitions of the function words and definitions of the command words are as shown in the following table.

| Serial number | Field name | Value range | Description |
| --- | --- | --- | --- |
| 1 | Function word (NetFn) | 0-255 | To identify data or a parameter related to a target function in a software system |
| 2 | Command word (Cmd) | 0-255 | To identify classification of different information categories under a function |

In some embodiments, in a step of setting the channel for publishing and subscribing to the redis database, the channel being configured for transmitting the function words and the command words, a channel name of the channel for publishing and subscribing to the redis database is set, and the channel is a channel for publishing and subscribing to the redis database; and the redis database is an internal memory type database defined through a key-value pair.

Figure 5:
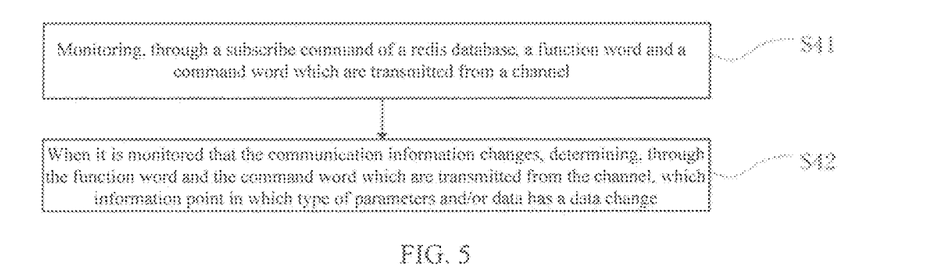
FIG. 5 is a flowchart of a step of monitoring the function words and the command words on the channel in real time to identify a changed function word and/or a changed command word in some embodiments.

As shown in FIG. 5, in some embodiments, a step of monitoring the function words and the command words on the channel in real time to identify the changed function word and/or the changed command word includes:

Step S41, monitoring, through a subscribe command of the redis database, the function words and the command words which are transmitted from the channel; and Step S42, when it is monitored that the communication information changes, determining, through the function words and the command words which are transmitted from the channel, which information point in which type of parameters and/or data has a data change.

In some embodiments, during determining whether the changed communication information is data information required or maintained by a corresponding process, if the changed communication information is not the data information required or maintained by the corresponding process, the channel is continued to be monitored. Namely, if the changed function word and/or the changed command word is not the data information required or maintained by the target process, the channel is continued to be monitored.

Figure 6:
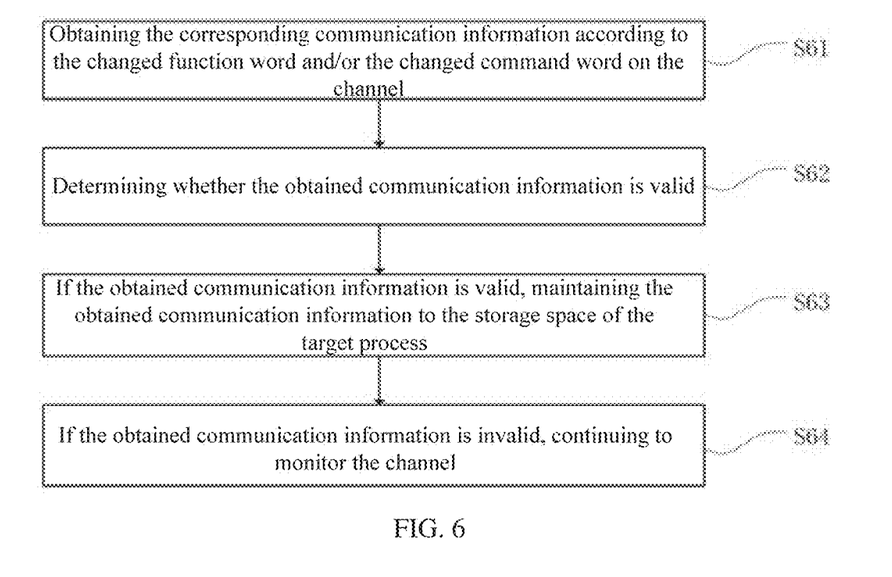
FIG. 6 is a flowchart of a step of obtaining corresponding communication information according to the changed function word and/or the changed command word on the channel, and maintaining the corresponding communication information to a storage space of a target process in some embodiments.

As shown in FIG. 6, a step of obtaining the corresponding communication information according to the changed function word and/or the changed command word on the channel, and maintaining the corresponding communication information to the storage space of the target process includes:

Step S61, obtaining the corresponding communication information according to the changed function word and/or the changed command word on the channel;

Step S62, determining whether the obtained communication information is valid;

Step S63, if the obtained communication information is valid, maintaining the obtained communication information to the storage space of the target process; and Step S64, if the obtained communication information is invalid, continuing to monitor the channel.

Figure 7:
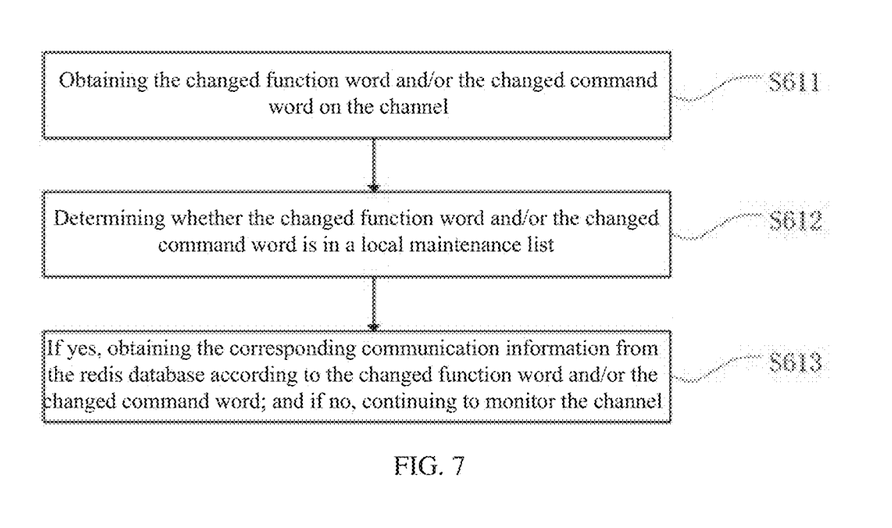
FIG. 7 is a flowchart of a step of obtaining the corresponding communication information according to the changed function word and/or the changed command word on the channel in some embodiments.

As shown in FIG. 7, in some embodiments, a step of obtaining the corresponding communication information according to the changed function word and/or the changed command word on the channel includes:

Step S611, obtaining the changed function word and/or the changed command word on the channel;

Step S612, determining whether the changed function word and/or the changed command word is in a local maintenance list;

Step S613, if the changed function word and/or the changed command word is in the local maintenance list, obtaining the corresponding communication information from the redis database according to the changed function word and/or the changed command word; and if the changed function word and/or the changed command word is not in the local maintenance list, continuing to monitor the channel.

In some embodiments, the publishing the function words and the command words, which are related to the communication information, onto the channel includes: through a publish command of the redis database, publishing the function words and the command words, which are related to the communication information, onto the channel.

In some embodiments, the corresponding parameters and/or data received by the corresponding process includes a parameter configured through a web interface or data monitored from a component such as a GPU. When the corresponding parameters and/or data received by the corresponding process is the parameter configured through the web interface or the data monitored from the component such as the GPU, it is determined that the corresponding communication information received by the corresponding process needs to be written into the redis database. Namely, the parameters include parameters configured through a web interface; and the data includes data monitored from a graphics processing unit.

According to an above data interaction method, mainly by designing each process as a producer and a consumer of communication information, monitoring changes in data and parameters in an entire software system through a subscribe mechanism of a redis database, and then integrating, according to a requirement of a current process, the communication information stored in the redis database into a storage space of a local process for application, the stability and robustness of the software system are improved. The method may be applied to software systems that use the redis database, and the competitiveness of a software product is improved.

The above data interaction method in the present application achieves decoupling of the modules of the BMC based on the publish and subscribe mechanisms of the redis database, and has the following advantages:

1. Through the publish and subscribe mechanisms of the redis database, different modules in the software system are completely decoupled. Each process needs to focus on data related to this process. Even if other processes hang up, this process may maintain normal operations of a local process according to the communication information obtained by this process.
2. The method for integrating the parameters and/or data in the redis database into a local internal memory space ensures that even if a breakdown or crash occurs in the redis database, the normal operations of the local process may not be affected. Furthermore, before the integration, the validity of the parameters and/or data is effectively verified to ensure the validity of the data in the local storage space.
3. Each message in a redis message channel includes a function word and a command word, occupying two bytes of the internal memory space. In this way, when a speed of the consumer is lower than a speed of the producer at a moment, as long as the customer is not always slower than the producer, normal operations of the software system may be ensured, and a common problem that the internal memory is excessively full may be avoided.
4. It is in a blocked state during event subscription, without occupying system resources of a central processing unit (CPU). Compared with a polling method, this method has higher efficiency and occupies a fewer of system resources.
5. For naming of subscribe and publish channels, classification and multiple naming may be performed according to requirements of own software systems, and more flexible application is achieved.

It is understood that although steps in the flowcharts of FIG. 2 to FIG. 6 are displayed in sequence according to instructions of the arrows, these steps are not necessarily performed in sequence according to the sequence indicated by the arrows. Unless otherwise explicitly specified in the present application, execution of the steps is not strictly limited, and the steps may be performed in other sequences. Moreover, at least some of the steps in FIG. 2 to FIG. 6 may include a plurality of substeps or a plurality of stages. These substeps or stages are not necessarily performed at the same moment but may be performed at different moments. Execution of these substeps or stages is not necessarily performed in sequence, but may be performed in turn or alternately with other steps or substeps in other steps or at least some of the stages.

Figure 8:
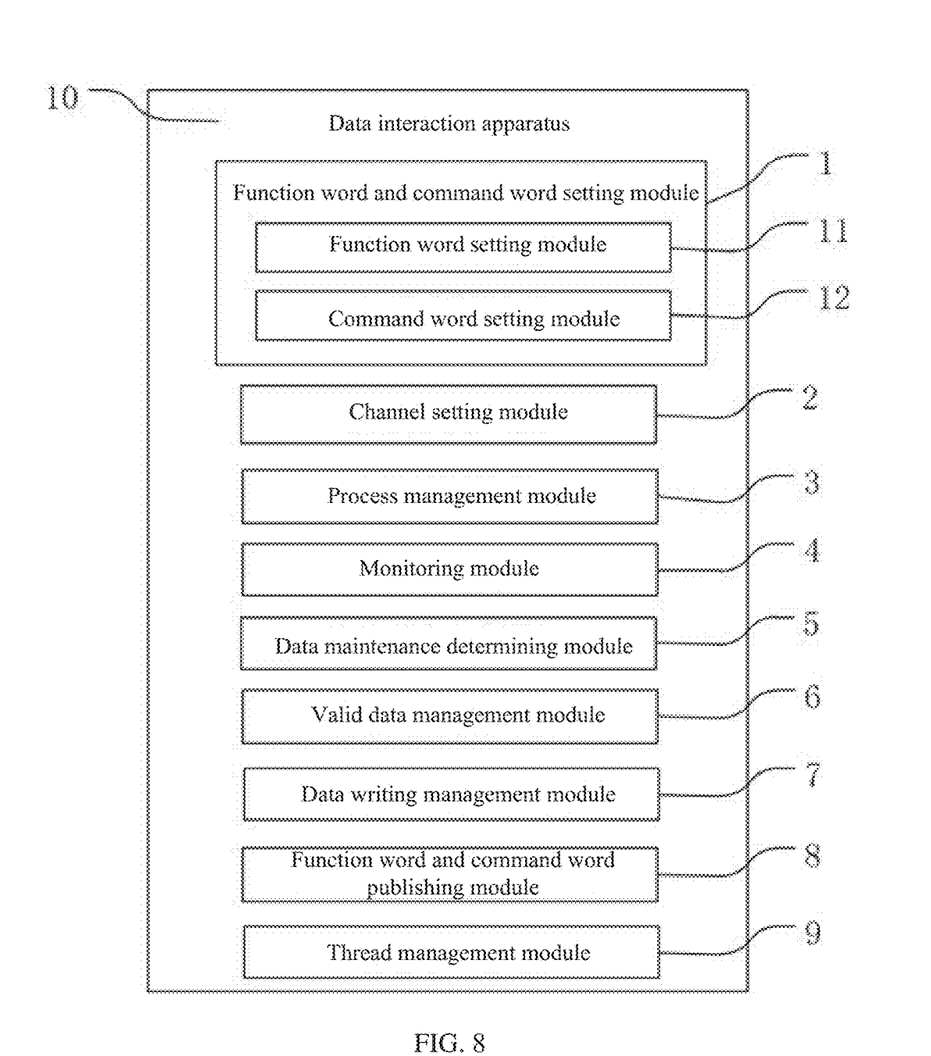
FIG. 8 is a structural block diagram of a data interaction apparatus in some embodiments.

In some embodiments, as shown in FIG. 8, a data interaction apparatus 10 is provided, including: a function word and command word setting module 1, a channel setting module 2, a process management module 3, a monitoring module 4, a data maintenance determining module 5, a valid data management module 6, a data writing management module 7, and a function word and command word publishing module 8.

The function word and command word setting module 1 is configured for constructing function words and command words, which are related to communication information, where the communication information is configured for performing interaction with a software system, and the communication information includes parameters and/or data.

The channel setting module 2 is configured for setting a channel for publishing and subscribing to a redis database, where the channel is configured for transmitting the function words and the command words.

The process management module 3 is configured for performing process definition and division according to functions of the software system. When started up, each target process creates a target thread for processing the communication information, and the target thread is configured for maintaining the communication information related to the target process.

The monitoring module 4 is configured for monitoring the function words and the command words on the channel in real time to identify a changed function word and/or a changed command word.

The data maintenance determining module 5 is configured for determining whether the changed function word and/or the changed command word is data information required or maintained by a target process.

The valid data management module 6 is configured for: in response to a determining result being that the changed function word and/or the changed command word is the data information required or maintained by the target process, obtaining corresponding communication information according to the changed function word and/or the changed command word on the channel, and maintaining the corresponding communication information to a storage space of the target process.

The data writing management module 7 is configured for: determining whether the corresponding communication information received by the corresponding process needs to be written into the redis database; and if the corresponding communication information received by the corresponding process needs to be written into the redis database, writing the corresponding communication information into the redis database.

The function word and command word publishing module 8 is configured for publishing the function words and the command words, which are related to the obtained communication information, onto the channel for use by other processes. The function word and the command word, which are related to the parameter, are published onto the channel through a publish command of the redis database.

As shown in FIG. 8, in some embodiments, the function word and command word setting module 1 includes: a function word setting module 11 and a command word setting module 12.

The function word setting module 11 is configured for setting identifiers to be the function words, the identifiers being configured for identifying a target function after classification according to functions. A value range of the function words is 0 to 255; and each function word is configured for identifying data or a parameter related to the target function in the software system.

The command word setting module 12 is configured for setting identifiers to be the command words, the identifiers being configured for classifying different interaction information categories under the target function. A value range of the command words is 0 to 255; and the command words include data information, attribute information, and state information.

In some embodiments, the channel setting module 2 is configured for setting a channel name for publishing and subscribing to the redis database; and the redis database is an internal memory type database defined through a key-value pair;

The monitoring module 4 is configured for: monitoring, through a subscribe command of the redis database, the function words and the command words which are transmitted from the channel; and if the changed function word and/or the changed command word is not the data information required or maintained by the target process, continuing to monitor the channel.

The data maintenance determining module 5 is configured for: during determining whether the changed communication information is data information required or maintained by a corresponding process, if the changed communication information is not the data information required or maintained by the corresponding process, continuing to monitor the channel.

The valid data management module 6 is configured for: obtaining the changed function word and/or the changed command word on the channel; determining whether the changed function word and/or the changed command word is in a local maintenance list; if the changed function word and/or the changed command word is in the local maintenance list, obtaining the corresponding communication information from the redis database according to the changed function word and/or the changed command word; and if the changed function word and/or the changed command word is not in the local maintenance list, continuing to monitor the channel.

The function word and command word publishing module 8 is configured for publishing the function word and the command word, which are related to the communication information, onto the channel through a publish command of the redis database.

In some embodiments, the software system includes the baseboard management controller (BMC) in the server, and power supply unit (PSU) information, sensor information, graphics processing unit (GPU) data, and assets information are classified according to functions in the baseboard management controller. A function word of the PSU information may be defined as 0x00, a function word of the sensor information may be defined as 0x01, a function word of the GPU data may be defined as 0x02, and a function word of the assets information may be defined as 0x03.

As shown in FIG. 8, in some embodiments, the data interaction apparatus 10 further includes a thread management module 9. The thread management module 9 is configured for creating, when each target process is started up, a target thread for processing the communication information. The target thread is configured for maintaining the communication information related to the target process.

In some embodiments, the corresponding parameters and/or data received by the corresponding process includes a parameter configured through a web interface or data monitored from a component such as a GPU. When the corresponding parameters and/or data received by the corresponding process is the parameter configured through the web interface or the data monitored from the component such as the GPU, it is determined that the corresponding communication information received by the corresponding process needs to be written into the redis database.

According to the above data interaction apparatus, mainly by designing each process as a producer and a consumer of communication information, monitoring changes in data and parameters in an entire software system through a subscribe mechanism of a redis database, and then integrating, according to a requirement of a current process, the communication information stored in the redis database into a storage space of a local process for application, the stability and robustness of the software system are improved. The method may be applied to software systems that use the redis database, and the competitiveness of a software product is improved.

The above data interaction apparatus in the present application achieves decoupling of the modules of the BMC based on the publish and subscribe mechanisms of the redis database, and has the following advantages:

1. Through the publish and subscribe mechanisms of the redis database, different modules in the software system are completely decoupled. Each process needs to focus on data related to this process. Even if other processes hang up, this process may maintain normal operations of a local process according to the communication information obtained by this process.
2. The method for integrating the parameters and/or data in the redis database into a local internal memory space ensures that even if a breakdown or crash occurs in the redis database, the normal operations of the local process may not be affected. Furthermore, before the integration, the validity of the parameters and/or data is effectively verified to ensure the validity of the data in the local storage space.

3. Each message in a redis message channel includes a function word and a command word, occupying two bytes of the internal memory space. In this way, when a speed of the consumer is lower than a speed of the producer at a moment, as long as the customer is not always slower than the producer, normal operations of the software system may be ensured, and a common problem that the internal memory is excessively full may be avoided.

4. It is in a blocked state during event subscription, without occupying system resources of a central processing unit (CPU). Compared with a polling method, this method has higher efficiency and occupies a fewer of system resources.

5. For naming of subscribe and publish channels, classification may be performed according to requirements of own software systems, and more flexible application is achieved.

The limitations on the data interaction apparatus may be found in the limitations on the data interaction method described above, and will not be elaborated here. The modules in the data interaction apparatus may be implemented entirely or partially through software, hardware, or a combination thereof. The above modules may be embedded in or independent of a processor in a computer device in a hardware form, or stored in a memory in the computer device in a software form, for the processor to invoke and execute the operations corresponding to the above modules.

Figure 9:
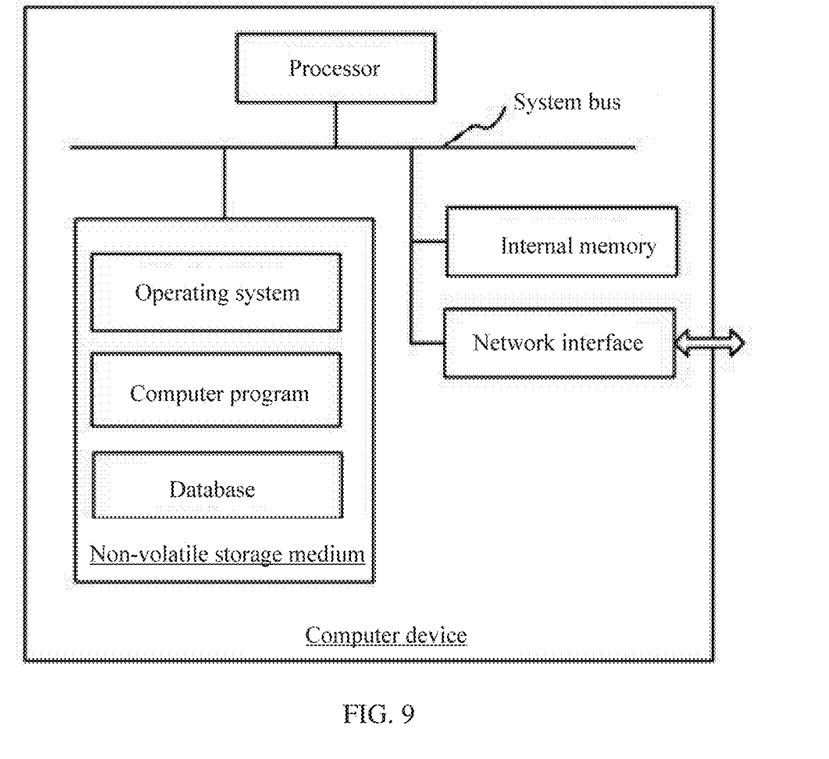
FIG. 9 is a diagram of an internal structure of a computer device in some embodiments.

In some embodiments, a computer device is provided. The computer device may be a server, a diagram of an internal structure of which may be as shown in FIG. 9. The computer device includes a processor, a memory, a network interface, and a database which are connected through a system bus. The processor of the computer device is configured for providing computation and control abilities. The memory of the computer device includes a non-volatile storage medium and an internal memory. The non-volatile storage medium stores an operating system, a computer program, and a database. The internal memory provides an environment for running the operating system and the computer program in the non-volatile storage medium. The database of the computer device is configured for storing data for data interaction. The network interface of the computer device is configured for communicating with an external terminal through network connection. The computer program is run by the processor to implement a data interaction method.

A person skilled in the art may understand that, the structure shown in FIG. 9 is merely a block diagram of partial structures related to a solution in the present application, and does not constitute a limitation on the computer device to which the solution of the present application is applied. In some embodiments, the computer device may include more components or fewer components than those shown in the figure, or some components may be combined, or a different component deployment may be used.

In some embodiments, a computer device is provided, including a memory, a processor, and a computer program stored on the memory and runnable on the processor. The processor, when running the computer program, implements the following steps:

constructing function words and command words, which are related to communication information, where the communication information is configured for performing interaction with a software system, and the communication information includes parameters and/or data;

setting a channel for publishing and subscribing to a redis database, the channel being configured for transmitting the function words and the command words;

performing process definition and division according to functions of the software system, where when started up, each target process creates a target thread for processing the communication information, and the target thread is configured for maintaining the communication information related to the target process;

monitoring the function words and the command words on the channel in real time to identify a changed function word and/or a changed command word;

determining whether the changed function word and/or the changed command word is data information required or maintained by a target process;

in response to a determining result being that the changed function word and/or the changed command word is the data information required or maintained by the target process, obtaining corresponding communication information according to the changed function word and/or the changed command word on the channel, and maintaining the corresponding communication information to a storage space of the target process;

determining whether the communication information obtained by the target process needs to be written into the redis database;

if the communication information obtained by the target process needs to be written into the redis database, writing the communication information obtained into the redis database; and publishing the function words and the command words, which are related to the communication information obtained, onto the channel for use by other processes.

The limitations on implementation of the steps when the processor runs the computer program may be found in the limitations on the data interaction method described above, and will not be elaborated here.

In some embodiments, a non-volatile computer-readable storage medium is provided, having a computer program stored thereon. The computer program, when run by a processor, implements the following steps:

constructing function words and command words, which are related to communication information, where the communication information is configured for performing interaction with a software system, and the communication information includes parameters and/or data;

setting a channel for publishing and subscribing to a redis database, the channel being configured for transmitting the function words and the command words;

performing process definition and division according to functions of the software system, where when started up, each target process creates a target thread for processing the communication information, and the target thread is configured for maintaining the communication information related to the target process;

monitoring the function words and the command words on the channel in real time to identify a changed function word and/or a changed command word;

determining whether the changed function word and/or the changed command word is data information required or maintained by a target process;

in response to a determining result being that the changed function word and/or the changed command word is the data information required or maintained by the target process, obtaining corresponding communication information according to the changed function word and/or the changed command word on the channel, and maintaining the corresponding communication information to a storage space of the target process;

determining whether the communication information obtained by the target process needs to be written into the redis database;

if the communication information obtained by the target process needs to be written into the redis database, writing the communication information obtained into the redis database; and publishing the function words and the command words, which are related to the communication information obtained, onto the channel for use by other processes.

The limitations on implementation of the steps when the computer program is run by the processor may be found in the limitations on the data interaction method described above, and will not be elaborated here.

A person of ordinary skill in the art may understand that all or some of the procedures of the method in the foregoing embodiments may be implemented by the computer-readable instructions that instruct relevant hardware. The computer program may be stored in a non-volatile computer-readable storage medium. When the computer program is executed, the procedures of the foregoing method embodiments may be implemented. Any reference to the memory, the database, or other media used in the embodiments provided in the present application may include a non-volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As an explanation rather than limitation, the RAM may be obtained in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SL-DRAM), a Rambus direct RAM (RDRAM), a direct memory bus dynamic RAM (DRDRAM), and a memory bus dynamic RAM (RDRAM).

The technical features of the above embodiments may be combined randomly. For the sake of brevity, all possible combinations of all the technical features in the above embodiments are not described. However, these technical features shall all be considered to fall within the scope of this specification as long as there is no contradiction in their combinations.

The foregoing embodiments merely express several implementations of the present application. The descriptions thereof are relatively detailed, but are not understood as limitations on the scope of the patent of the application. A person of ordinary skill in the art may also make several transformations and improvements without departing from the idea of the present application. These transformations and improvements fall within the protection scope of the present application. Therefore, the protection scope of the patent of the present application shall be subject to the appended claims.

The invention claimed is:

1. A data interaction method executing by a hardware processor, comprising:

constructing function words and command words, which are related to communication information, wherein the communication information is configured for performing interaction with a software system, and the communication information comprises at least one of parameters or data;

setting a channel for publishing and subscribing to a remote dictionary server (redis) database, the channel being configured for transmitting the function words and the command words;

performing process definition and division according to functions of the software system, wherein each process initiates a thread at startup for processing the communication information, and the thread is configured for maintaining the communication information related to the process;

monitoring the function words and the command words on the channel in real time to identify at least one of a changed function word or a changed command word;

determining whether the at least one of the changed function word or the changed command word is data information required or maintained by a target process;

in response to determining the at least one of the changed function word or the changed command word is the data information required or maintained by the target process, obtaining corresponding communication information by the target process according to the at least one of the changed function word or the changed command word on the channel, and maintaining the corresponding communication information by a target thread to a local storage space of the target process, whereby the target process maintains a normal operation of a local process based on the corresponding communication information maintained in the local storage space of the target process, wherein the target thread is a thread created by the target process to process communication information at startup;

determining whether the corresponding communication information obtained by the target process needs to be written into the remote dictionary server database;

when the corresponding communication information obtained by the target process needs to be written into the remote dictionary server database, writing the corresponding communication information obtained into the remote dictionary server database; and publishing the function words and the command words, which are related to the corresponding communication information obtained, onto the channel for use by other processes.

2. The data interaction method executing by the hardware processor according to claim 1, wherein the obtaining corresponding communication information by the target process according to the at least one of the changed function word or the changed command word on the channel, and maintaining the corresponding communication information by a target thread to a local storage space of the target process comprises:

obtaining the corresponding communication information according to the at least one of the changed function word or the changed command word on the channel;

determining whether the corresponding communication information obtained is valid; and in response to determining the corresponding communication information obtained is valid, maintaining the corresponding communication information obtained to the local storage space of the target process.

3. The data interaction method executing by the hardware processor according to claim 2, wherein, in response to determining the corresponding communication information obtained is invalid, continuing to monitor the channel.

4. The data interaction method executing by the hardware processor according to claim 1, wherein in a step of the constructing function words and command words, which are related to communication information, the function words are identifiers for identifying a target function after classification according to the functions of the software system, and the command words are configured for classifying different interaction information categories under the target function.

5. The data interaction method executing by the hardware processor according to claim 4, wherein a value range of the function words is 0 to 255, and each of the function words is configured for identifying data or a parameter related to the target function in the software system.

6. The data interaction method executing by the hardware processor according to claim 4, wherein the software system comprises a baseboard management controller in a server, and the communication information comprises power supply unit information, sensor information, graphics processing unit data, and assets information which are classified according to functions in the baseboard management controller.

7. The data interaction method executing by the hardware processor according to claim 4, wherein a value range of the command words is 0 to 255, and the command words comprise data information, attribute information, and state information.

8. The data interaction method executing by the hardware processor according to claim 1, further comprising:
monitoring, through a subscribe command of the remote dictionary server database, the function words and the command words which are transmitted from the channel.

9. The data interaction method executing by the hardware processor according to claim 1, wherein, in response to determining the at least one of the changed function word or the changed command word is not the data information required or maintained by the target process, continuing to monitor the channel.

10. The data interaction method executing by the hardware processor according to claim 1, wherein the obtaining corresponding communication information by the target process according to the at least one of the changed function word or the changed command word on the channel comprises:
obtaining the at least one of the changed function word or the changed command word on the channel;
determining whether the at least one of the changed function word or the changed command word is in a local maintenance list; and
in response to determining the at least one of the changed function word or the changed command word is in the local maintenance list, obtaining the corresponding communication information from the remote dictionary server database according to the least one of the changed function word or the changed command word.

11. The data interaction method executing by the hardware processor according to claim 10, wherein in response to determining the at least one of the changed function word or the changed command word are not in the local maintenance list, continuing to monitor the channel.

12. The data interaction method executing by the hardware processor according to claim 1, wherein the publishing the function words and the command words, which are related to the corresponding communication information obtained, onto the channel for use by other processes comprises:
publishing the function words and the command words, which are related to the corresponding communication information obtained, onto the channel through a publish command of the remote dictionary server database.

13. The data interaction method executing by the hardware processor according to claim 1, wherein the parameters comprise parameters configured through a web interface; and the data comprises data monitored from a graphics processing unit.

14. The data interaction method executing by the hardware processor according to claim 1, further comprising:
setting a channel name of the channel for publishing and subscribing to the remote dictionary server database.

15. The data interaction method executing by the hardware processor according to claim 14, wherein the channel name is configured for a channel providing a notification for a change in the communication information of the software system.

16. The data interaction method executing by the hardware processor according to claim 1, wherein the remote dictionary server database is an internal memory type database defined through a key-value pair.

17. The data interaction method executing by the hardware processor according to claim 1, wherein each message in the channel comprises the function words and the command words occupying two bytes of an internal memory space.

18. A computer device, comprising a memory, a processor, and a computer program stored on the memory and runnable on the processor, wherein the processor, when running the computer program, implements steps of a data interaction method, comprising:
constructing function words and command words, which are related to communication information, wherein the communication information is configured for performing interaction with a software system, and the communication information comprises at least one of parameters or data;
setting a channel for publishing and subscribing to a remote dictionary server (redis) database, the channel being configured for transmitting the function words and the command words;
performing process definition and division according to functions of the software system, wherein each process initiates a thread at startup for processing the communication information, and the thread is configured for maintaining the communication information related to the process;
monitoring the function words and the command words on the channel in real time to identify at least one of a changed function word or a changed command word;
determining whether the at least one of the changed function word or the changed command word is data information required or maintained by a target process;
in response to determining the at least one of the changed function word or the changed command word is the data information required or maintained by the target process, obtaining corresponding communication information by the target process according to the at least one of the changed function word or the changed command word on the channel, and maintaining the corresponding communication information by a target thread to a local storage space of the target process, whereby the target process maintains a normal operation of a local process based on the corresponding communication information maintained in the local storage space of the target process, wherein the target thread is a thread created by the target process to process communication information at startup;
determining whether the corresponding communication information obtained by the target process needs to be written into the remote dictionary server database;
when the corresponding communication information obtained by the target process needs to be written into the remote dictionary server database, writing the corresponding communication information obtained into the remote dictionary server database; and
publishing the function words and the command words, which are related to the corresponding communication information obtained, onto the channel for use by other processes.

19. A non-volatile computer-readable storage medium, having a computer program stored thereon, wherein the computer program, when run by a processor, implements steps of a data interaction method, comprising:
constructing function words and command words, which are related to communication information, wherein the communication information is configured for performing interaction with a software system, and the communication information comprises at least one of parameters or data;
setting a channel for publishing and subscribing to a remote dictionary server (redis) database, the channel being configured for transmitting the function words and the command words;
performing process definition and division according to functions of the software system, wherein each process initiates a thread at startup for processing the communication information, and the thread is configured for maintaining the communication information related to the process;
monitoring the function words and the command words on the channel in real time to identify at least one of a changed function word or a changed command word;
determining whether the at least one of the changed function word or the changed command word is data information required or maintained by a target process;
in response to determining that the at least one of the changed function word or the changed command word is the data information required or maintained by the target process, obtaining corresponding communication information by the target process according to the at least one of the changed function word or the changed command word on the channel, and maintaining the corresponding communication information by a target thread to a local storage space of the target process, whereby the target process maintains a normal operation of a local process based on the corresponding communication information maintained in the local storage space of the target process, wherein the target thread is a thread created by the target process to process communication information at startup;
determining whether the corresponding communication information obtained by the target process needs to be written into the remote dictionary server database;
when the corresponding communication information obtained by the target process needs to be written into the remote dictionary server database, writing the corresponding communication information obtained into the remote dictionary server database; and
publishing the function words and the command words, which are related to the corresponding communication information obtained, onto the channel for use by other processes.

* * * * *